US011615618B2

(12) United States Patent
Yin et al.

(10) Patent No.: US 11,615,618 B2
(45) Date of Patent: Mar. 28, 2023

(54) AUTOMATIC IMAGE ANNOTATIONS

(71) Applicant: International Business Machines Corporation, Armonk, NY (US)

(72) Inventors: Kun Yan Yin, Ningbo (CN); Chao Yu, Ningbo (CN); Ming Jin Chen, Zhe Jiang (CN); Teng Sun, Beijing (CN); Hong Bing Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 17/225,165

(22) Filed: Apr. 8, 2021

(65) Prior Publication Data

US 2022/0327312 A1    Oct. 13, 2022

(51) Int. Cl.
*G06K 9/62* (2022.01)
*G06V 20/20* (2022.01)
*G06V 10/46* (2022.01)

(52) U.S. Cl.
CPC ........... *G06V 20/20* (2022.01); *G06K 9/6215* (2013.01); *G06K 9/6288* (2013.01); *G06V 10/462* (2022.01)

(58) Field of Classification Search
CPC .... G06V 20/20; G06V 10/462; G06K 9/6215; G06K 9/6288
See application file for complete search history.

(56) References Cited

U.S. PATENT DOCUMENTS

| 8,189,880 | B2 | 5/2012 | Wen |
| 9,118,886 | B2 | 8/2015 | Wang |
| 2012/0039539 | A1* | 2/2012 | Boiman ................. G11B 27/34 |
| | | | 382/224 |

(Continued)

FOREIGN PATENT DOCUMENTS

| CN | 109255790 A | 1/2019 |
| WO | 2017190743 A1 | 11/2017 |

OTHER PUBLICATIONS

Borji et al., "Salient Object Detection: A Survey", Computational Visual Media, DOI 10.1007/s41095-019-0149-9, vol. 5, No. 2, Jun. 2019, 25 pages, arXiv:1411.5878v6 [cs.CV] Jul. 1, 2019.

(Continued)

*Primary Examiner* — Matthew C Bella
*Assistant Examiner* — Kathleen M Broughton
(74) *Attorney, Agent, or Firm* — Erika R. DeCosty

(57) ABSTRACT

A computer-implemented method for annotating images is disclosed. The computer-implemented method includes generating a saliency map corresponding to an input image, wherein the input image is an image that requires annotation, generating a behavior saliency map, wherein the behavior saliency map is a saliency map formed from an average of a plurality of objects contained within respective bounding boxes of a plurality of sample images, generating a historical saliency map, wherein the historical saliency map is a saliency map formed from an average of a plurality of tagged objects in the plurality of sample images, fusing the saliency map corresponding to the input image, the behavior saliency map, and the historical saliency map to form a fused saliency map, and generating, based on the fused saliency map, a bounding box around an object in the input image.

20 Claims, 5 Drawing Sheets

(56) References Cited

U.S. PATENT DOCUMENTS

| | | | |
|---|---|---|---|
| 2016/0086052 A1* | 3/2016 | Piekniewski | G06V 10/462 |
| | | | 382/103 |
| 2017/0262996 A1* | 9/2017 | Jain | G06K 9/628 |
| 2018/0285682 A1* | 10/2018 | Najibi | G06N 3/0454 |
| 2019/0294970 A1 | 9/2019 | Fidler | |
| 2019/0311202 A1* | 10/2019 | Lee | G06T 9/002 |
| 2019/0392242 A1* | 12/2019 | Tariq | G06K 9/627 |
| 2020/0097754 A1* | 3/2020 | Tawari | G06K 9/627 |

OTHER PUBLICATIONS

Fan et al., "Automatic Image Annotation by Using Concept-Sensitive Salient Objects for Image Content Representation", SIGIR'04 Jul. 25-29, 2004, Sheffield, South Yorkshire, UK, Copyright 2004 ACM 1-58113-881-4/04/0007, pp. 361-368.
Le et al., "Toward Interactive Self-Annotation For Video Object Bounding Box: Recurrent Self-Learning And Hierarchical Annotation Based Framework", 2020 IEEE Winter Conference on Applications of Computer Vision (WACV), 10 pages.
Wang et al., "AnnoSearch: Image Auto-Annotation by Search", Conference Paper in Proceedings / CVPR, IEEE Computer Society Conference on Computer Vision and Pattern Recognition—Feb. 2006, ResearchGate, DOI: 10.1109/CVPR.2006.58, Source: IEEE Xplore, 9 pages.
Wang et al., "Learning to Detect Salient Objects with Image-level Supervision", Published Nov. 9, 2017, 10 pages.
Shi et al., "Hierarchical Image Saliency Detection on Extended CSSD", IEEE Transactions on Pattern Analysis and Machine Intelligence, arXiv:1408.5418v2 [cs.CV] Aug. 4, 2015, 14 pages.

* cited by examiner

AUTOMATIC IMAGE ANNOTATIONS

BACKGROUND

The present invention relates generally to annotating objects in images, and more particularly to annotating objects in images based on a combination of saliency maps.

Computer vision is an interdisciplinary field that deals with how computers can be made to gain high-level understanding from digital images or videos. For example, through the use of machine learning and artificial intelligence, the process of automating image annotation can be achieved. Image annotation is the process by which a computer system automatically assigns metadata in the form of captioning, labels, or keywords to a digital image. Image annotation is used in image retrieval systems to organize and locate images of interest from a database.

Image annotation requires a multitude of manually annotated datasets to generate a particular training model for future automatic annotation and tagging of particular objects. Image annotators annotate images by drawing or inserting boxes (i.e., bounding boxes) around the target object within a photo or video that requires tagging based on a training model derived from prior annotations. The boxes around the target object, typically known as "bounding boxes," are a form of annotation. The objects contained within the bounding boxes may then be classified as a particular type or category of image via image classification.

Image annotation is helpful in many settings like medical images or personal images. Oftentimes, a user wants to annotate a large set of images. Embodiments of the present invention recognize that typically, large amounts (e.g., in the thousands) of objects in images must be manually annotated in order to build a robust training model for use by a computer to automatically annotate objects in future images. Whereas different training models require different sets of annotated images, it becomes extremely time consuming and costly to have individuals manually annotate images used to generate various training models for different categories or types of images.

One way to perform image annotation is by manual annotation of images. For example, U.S. Pat. No. 8,189,880B2 discloses "[i] nteractive photo annotation using a clustering technique based on facial similarities is described. A face recognition algorithm is used to extract facial features of a photo album and cluster the photos in the album into multiple face groups (clusters) based on facial similarity. A cluster annotation technique places similar faces together into groups or clusters, and enables user to label a group or cluster collectively in one operation. However, this is disadvantageous in that the user must manually annotate each image.

Another way to perform image annotation is to train a generated model. For example, WO2017190743A1 discloses "a model in a neural network for object detection in an unprocessed image, where the construction may be performed based on at least one image training batch," and that the model is "constructed by training one or more collective model variables in the neural network to classify the individual annotated objects as a member of an object class." However, this is disadvantageous because there is still a need to label some initial data manually to generate an initial model and some new categories which cannot be recognized by the model. Furthermore, the user may need to continuously train the model in order to correct or refine the model itself.

Embodiments of the present invention recognize that it is extremely time consuming to manually annotate a large number of images in order to create an initial training model based on the manually annotated images. Even requiring an individual to manually annotate a small portion of a large set of images is extremely time consuming. Accordingly, embodiments of the present invention recognize the need to provide an automatic annotation method that does not require initial manual annotation of data objects and limits the amount of key point information necessary to build a training model for automatic image annotation.

SUMMARY

According to one embodiment of the present invention, a computer-implemented method for annotating images is disclosed. The computer-implemented method includes generating a saliency map corresponding to an input image, wherein the input image is an image that requires annotation. The computer-implemented method further includes generating a behavior saliency map, wherein the behavior saliency map is a saliency map formed from an average of a plurality of objects contained within respective bounding boxes of a plurality of sample images. The computer-implemented method further includes generating a historical saliency map, wherein the historical saliency map is a saliency map formed from an average of a plurality of tagged objects in the plurality of sample images. The computer-implemented method further includes fusing the saliency map corresponding to the input image, the behavior saliency map, and the historical saliency map to form a fused saliency map. The computer-implemented method further includes generating, based on the fused saliency map, a bounding box around an object in the input image.

According to another embodiment of the present invention, a computer program product for annotating images is disclosed. The computer program product includes one or more computer readable storage media and program instructions stored on the one or more computer readable storage media. The program instructions include instructions to generate a saliency map corresponding to an input image, wherein the input image is an image that requires annotation. The program instructions further include instructions to generate a behavior saliency map, wherein the behavior saliency map is a saliency map formed from an average of a plurality of objects contained within respective bounding boxes of a plurality of sample images. The program instructions further include instructions to generate a historical saliency map, wherein the historical saliency map is a saliency map formed from an average of a plurality of tagged objects in the plurality of sample images. The program instructions further include instructions to fuse the saliency map corresponding to the input image, the behavior saliency map, and the historical saliency map to form a fused saliency map. The program instructions further include instructions to generate, based on the fused saliency map, a bounding box around an object in the input image.

According to another embodiment of the present invention, a computer system for annotating images is disclosed. The computer system includes one or more computer processors, one or more computer readable storage media, computer program instructions, the computer program instructions being stored on the one or more computer readable storage media for execution by the one or more computer processors. The program instructions include instructions to generate a saliency map corresponding to an input image, wherein the input image is an image that requires annotation. The program instructions further include instructions to generate a behavior saliency map, wherein the behavior saliency map is a saliency map formed from an average of a plurality of objects contained within respective bounding boxes of a plurality of sample images. The program instructions further include instructions to generate a historical saliency map, wherein the historical saliency map is a saliency map formed from an average of a plurality of tagged objects in the plurality of sample images. The program instructions further include instructions to fuse the saliency map corresponding to the input image, the behavior saliency map, and the historical saliency map to form a fused saliency map. The program instructions further include instructions to generate, based on the fused saliency map, a bounding box around an object in the input image.

The above listed embodiments of the present invention provide advantages to current known techniques by providing a method to pre-annotate objects on image based on salience map combining real-time behavior and labeling history. Embodiments of the present invention provide advantages by extracting a salient map based on image content itself. Embodiments of the present invention provide advantages by separately computing a behavior salient map, and history similar salient map. Embodiments of the present invention provide advantages by bunding box based on a weighted composed salient map. and a tag searching engine will help to tag it.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
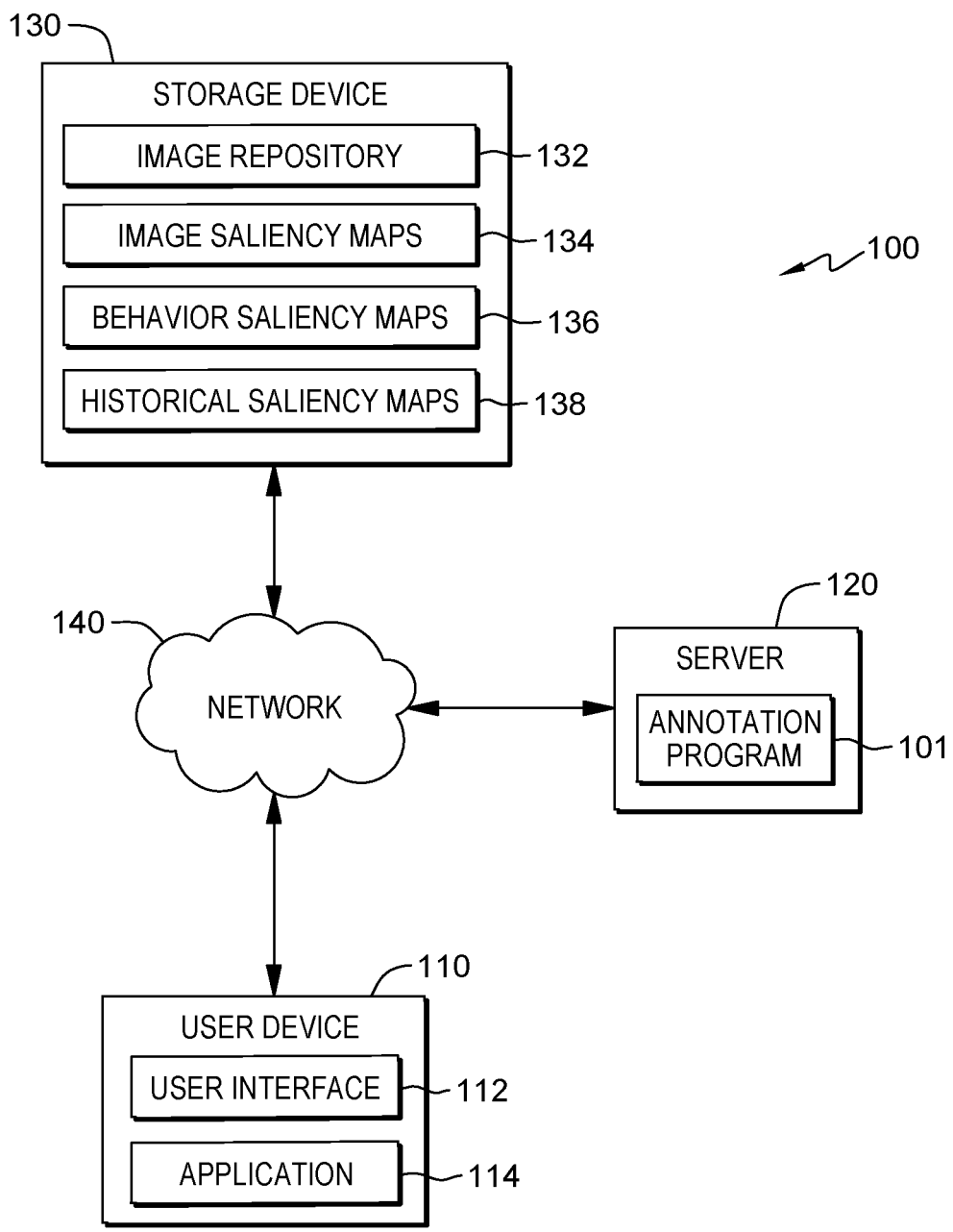
FIG. 1 is a block diagram of a computing system in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of annotating objects in images, and more particularly to annotating objects in images based on a combination of saliency maps.

Image annotation is helpful in many settings like medical images or personal images. Oftentimes, a user wants to annotate a large set of images. Typically, large amounts (e.g., in the thousands) of objects in images must be manually annotated in order to build a robust training model for use by a computer to automatically annotate objects in future images. Whereas different training models require different sets of annotated images, it becomes extremely time consuming and costly to have individuals manually annotate images used to generate various training models for different categories or types of images.

One way to train a generated model is by a user manually annotating images to train the model. However, this is disadvantageous because there is still a need to label some initial data manually to generate an initial model and some new categories which cannot be recognized by the model. Another way to train a model requires the user to input some key points and based upon the key points the model can automatically begin annotating. Key point annotation is used to detect small object and shape variations by creating dots across the images to detect facial features, facial expressions, human body parts, and poses. In this model, the user still needs to label some input data and often the user may continuously need to correct the model.

Embodiments of the present invention recognize that it is extremely time consuming to manually annotate a large number of images in order to create an initial training model based on the manually annotated images. Even requiring an individual to manually annotate a small portion of a large set of images is extremely time consuming. Embodiments of the present invention further recognize accurate data annotations help build robust models. Embodiments of the present invention recognize on average 30-40% of objects in an image are similar to other nearby images for each dataset and on average 50-60% are similar in videos. Embodiments of the present invention recognize the need to provide an automatic annotation method that does not require initial manual annotation of data objects and limits the amount of key point information necessary to build a training model for automatic image annotation.

Embodiments of the present invention improve upon the foregoing deficiencies by automatically annotating a new set of images without requiring an initial training model constructed from a large database of manually annotated images. Embodiments of the present invention provide a method to automatically annotate objects in images based on a combination of different saliency maps that combine real-time behavior and labeling history. According to embodiments of the present invention, a saliency map is generated from an image that requires annotating based on the image content itself. According to embodiments of the present invention, behavior saliency maps and historical saliency maps are also generated and combined with the saliency map generated from the image itself to form a fused saliency map. According to embodiments of the present invention, bounding boxes are automatically created around objects of images in the fused saliency map without requiring a model trained from a manually annotated image training set.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a computing system, generally designated 100, for automatic image annotating in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Computing system 100 includes user device 110, storage device 130, and server 120 interconnected over network 140. User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operate on user device 110. In various example embodiments, application 114 can be an application that a user of user device 110 utilizes to select or input images that require annotating. In other embodiments, application 114 can be another mobile device application (e.g., a web browser, enterprise-specific messaging application, social media application, etc.). For example, application 114 is a client-side application associated with server 120 (e.g., a client-side application associated with annotation program 101).

In an additional embodiment, application 114 can operate to perform processing steps of annotation program 101 (i.e., application 114 can be representative of annotation program 101 operating on user device 110), in accordance with various embodiments of the present invention. For example, a user of user device 110 can input an image to be annotated utilizing application 114 and view the resulting annotated image on user device 110 (e.g., via user interface 112). In an embodiment, user device 110 can be in intermittent communication with annotation program 101 residing on server 120. For example, user device 110 can request to annotate an image (e.g., while not connected to network 140) and then communicate the request to annotation program 101 at a later time (e.g., when capable of connecting to network 140).

In example embodiments, storage device 130 is a data repository for persistently storing and managing collections of data. In an embodiment, storage device 130 includes information which annotation program 101 retrieves and accesses over a wireless connection, such as network 140. In an embodiment, storage device 130 includes various images in an image repository, such as image repository 132 (a collection of related images used to automatically annotate objects in an image). In an embodiment, storage device 130 includes images which require annotation. In an embodiment, storage device 130 stores images previously annotated. In an embodiment, the images previously annotated were annotated by annotation program 101. In an embodiment, the images previously annotated were annotated by an external database, website, annotator, etc. In an embodiment, storage device 130 includes one or different types of maps. For example, storage device 130 includes one or more saliency maps. In embodiments, storage device 130 includes image saliency maps 134, behavior saliency maps 136, and historical saliency maps 138.

In an embodiment, annotation program 101 retrieves images from and stores images to storage device 130. For example, annotation program 101 accesses images to be annotated from storage device 130. In an embodiment, annotation program 101 uploads images that require annotating to storage device 130. In an embodiment, annotation program 101 stores one or more annotated images in storage device 130. In an embodiment, a user accesses storage device 130 to view annotated images stored in storage device 130.

In example embodiments, server 120 can be a desktop computer, a computer server, or any other computer systems, known in the art. In certain embodiments, server 120 represents computer systems utilizing clustered computers and components (e.g., database server computers, application server computers, etc.) that act as a single pool of seamless resources when accessed by components of computing environment 100 (e.g., user device 110, storage device 130, and other devices not shown). In general, server 120 is representative of any electronic device or combination of electronic devices capable of executing computer readable program instructions. Server 120 may include components as depicted and described in further detail with respect to FIG. 5, in accordance with embodiments of the present invention. In an embodiment, annotation program 101 resides on server 120. In an embodiment, annotation program 101 does not reside on server 120. In an embodiment, annotation program 101 resides on user device 110 or storage device 130.

Server 120 further includes annotation program 101. In an embodiment, annotation program 101 receives a set of data requiring annotations. In an embodiment, annotation program 101 generates a saliency map based on an image. In an embodiment, annotation program 101 generates a behavior saliency map. In an embodiment, annotation program 101 generates a historical saliency map based on images that are similar to an image requiring annotation.

In an embodiment, annotation program 101 receives a set of data requiring annotations. In an embodiment, the data is a set of images. In an embodiment, the data is a video. In the case of video data, the video may be broken down into individual image frames. For example, if a 10 second video is received, annotation program 101 breaks down the video into images for every 0.5 seconds. In this example, annotation program 101 generates 20 images from the 10 second video.

In an embodiment, annotation program 101 generates saliency maps. A saliency map is an image in which the brightness of a pixel represents how salient the pixel is (i.e the brightness of a pixel is directly proportional to its saliency). A saliency map shows each pixel's unique quality by locating important regions or objects in images. In other words, the purpose of the saliency map is to find the regions which are prominent or noticeable at every location in the visual field and to guide the selection of attended locations, based on the spatial distribution of saliency. In an embodiment, annotation program 101 generates a binarized saliency map. For example, an input image of a brown dog in a green field will have a saliency map indicating the contrast between the dog and the field. A resulting binarized saliency map for this example will show the dog in white and the field in black. In an embodiment, the final saliency map is produced in a hierarchical model. This is accomplished by finding saliency values optimally in a tree model. In an embodiment, annotation program 101 generates a saliency map based on a hierarchical model and analyzing saliency cues from multiples levels of structure. For example, annotation program 101 analyzes different saliency cues located in different image layers.

In an embodiment, annotation program 101 generates one or more image layers of different scales from an input image. In an embodiment, annotation program 101 generates image layers with differing degrees of detailedness. In an embodiment, annotation program 101 generates a hierarchical model. In an embodiment, annotation program 101 generates saliency cues for each segmented image layer. In an embodiment, annotation program 101 generates image layers with different saliency cues. Saliency cues indicate points of an image which are important that a user typically focuses on. For example, saliency cues indicate color or a defining element that distinguish one target from another. Saliency cues may also indicate key information to facilitate identification of an object or person of interest in the image.

In an embodiment, annotation program 101 generates image layers from an input image. In an embodiment, annotation program 101 generates oversegmentated images from an initial image. Oversegmentation is the process by which the objects being segments from the background are themselves segmented or fractured into subcomponents. Oversegmentation increases the chances that boundaries of importance are realized. Performing oversegmentation enables annotation program 101 to apply an iterative process to merge neighboring segments. In an embodiment, annotation program 101 sorts all regions in an initial map according to their scales in ascending order. In an embodiment, if a region is below a certain threshold, the region is merged with its nearest region and their colors are averaged. In an embodiment, annotation program 101 generates one or more layers with one or more different thresholds. In an embodiment, annotation program 101 computes a scale value. In an embodiment, annotation program 101 determines the scale value based on shape uniformities to further determine region sizes for merging regions. In an embodiment, annotation program 101 labels each layer to produce a resulting regional map.

In an embodiment, annotation program 101 generates cue maps. Cue maps reveal saliency in different scales. Cue maps are applied to find important pixels from the perspectives of color, position, and size. In an embodiment, annotation program 101 generates cue maps by identifying local contrasts in an image or image layer. For example, a contrast saliency cue for a pixel in the input image is dependent on the number of pixels and the colors of the pixels. Typically, regions with more pixels contribute to higher local-contrast weights than those containing fewer pixels.

In an embodiment, annotation program 101 determines hierarchical inferences. In an embodiment, the cue maps previously generated reveal saliency in one or more different scales. For example, one cue map has small regions while another cue map contains large-scale structures. In these instances, one single map or layer may be determinative. In an embodiment, annotation program 101 determines a hierarchical inference based on a tree-structure graphical model. In an embodiment, annotation program 101 determines nodes which represent regions in their corresponding layers. In an embodiment, the hierarchical model is generated by applying a weighted average to all single-layer saliency cue maps.

In an embodiment, annotation program 101 automatically generates one or more bounding boxes around objects in an image based, at least in part, on generating a saliency map of the image and combing real-time behavior and labeling history. In an embodiment, annotation program 101 automatically generates one or more bounding boxes in an image based, at least in part, on a fused saliency map generated from a combination of a saliency map of an input image, one or more behavior saliency maps, and one or more historical saliency maps. In an embodiment, annotation program 101 generates a saliency map based on an image. In an embodiment, annotation program 101 generates a behavior saliency salient map based on an image. In an embodiment, annotation program 101 generates a historical saliency map based on an image. In an embodiment, annotation program 101 generates a weighted fused saliency map. In an embodiment, annotation program 101 generates the weighted fused saliency map based on analyzing one or more of the image saliency map, behavior saliency map, and historical saliency map.

In an embodiment, annotation program 101 generates the weighted fused saliency map based on image fusion. Image fusion is the process of gathering all the important information from multiple images, and their inclusion into fewer images, usually a single one. This single image is more informative and accurate than any single source image, and it consists of all the necessary information. The purpose of image fusion is not only to reduce the amount of data but also to construct images that are more appropriate and understandable for the human and machine perception. For example, in computer vision, multi-sensor image fusion is the process of combining relevant information from two or more images into a single image. The resulting image will be more informative than any of the input images.

In an embodiment, annotation program 101 generates a behavior saliency map based on an input image. In some embodiments, the behavior saliency map is binarized. Accordingly, the behavior saliency map is presented in grayscale. In an embodiment, the behavior saliency map is generated from an image that includes one or more predetermined characteristics, such as certain poses, behavior, orientation, position, location, size, and saliency of an object that is shared between a sample image and the input image that requires annotation. In an embodiment, the behavior saliency map is generated from a combination of images that include one or more predetermined characteristics, such as certain poses, behavior, orientation, position, location, size, and saliency of an object that is shared between a plurality of sample images and the input image that requires annotation. In an embodiment, a behavior saliency map depicts the position, location, and/or size of bounding boxes placed around objects of images most similar to an image that requires annotating. In an embodiment, a behavior saliency map only includes the areas of the map contained by a bounding box. Accordingly, the areas contained by a bounding box are presented in greyscale.

In an embodiment, annotation program 101 compares a saliency map generated from an input image that requires annotation to a plurality of images previously annotated with bounding boxes (e.g., from a database or images previously annotated by annotation program 101). In an embodiment, annotation program 101 determines if the input image is similar to a sample image. In an embodiment, annotation program 101 determines a degree of similarity between an input image and a sample image based on the two images. In an embodiment, two images are similar if the two images share a number of salient features or characteristics above a predetermined threshold. For example, an input image that requires annotation is compared to a plurality of sample images to find other images that have similar saliency values at similar locations in the image. In another example, an input image that requires annotation is compared to a plurality of sample images to find other images that have similar saliency cues at similar locations or positions in the image and/or image layer.

In an embodiment, a behavior saliency map is generated for each sample image having a similarity score with the input image above a predetermined threshold. In an embodiment, the input image and a behavior saliency map corresponding to a sample image share a similarity score above a predetermined threshold based on a location of bounding boxes surrounding pixels having a particular brightness, greyscale, and/or shape matching a location of the pixels having a similar brightness, greyscale, and/or shape of an image saliency map corresponding to an input image requiring annotating. In an embodiment, an average of a plurality of behavior saliency maps having a similarly score with the input image above a predetermined threshold is generated, in which the average of the location, size, and position of the bounding boxes in the plurality of similar saliency maps is calculated and displayed on a single behavior saliency map. In an embodiment, the behavior saliency map formed from the plurality of behavior saliency maps includes the salient area contained within the bounding boxes. In other words, the salient area includes the various levels of brightness of the respective pixels located within the salient area contained by a bounding box.

In an embodiment, annotation program 101 determines a window of similar images. In an embodiment, annotation program 101 set the behavior window and if the images are similar, annotation program 101 calculates the averages as the behavior saliency map. In an embodiment, if a first image is compared to a plurality of images, a number of similar images from the plurality of images will be selected. In an embodiment, the first image is compared to the plurality of images to find other images that have similar distinguishing features, such as particular colors, objects being located in similar positions in the images, bounding boxes being located in similar areas in the image, etc. Then, the most similar images are selected and an average of the location, size, position, etc. of the bounding boxes is calculated to form a behavior saliency map.

In an embodiment, annotation program 101 identifies historical saliency maps that are similar to an input image that requires annotation. In some embodiments, the historical saliency map is binarized. Accordingly, the historical saliency map is presented in grayscale. In an embodiment, a historical saliency map is a saliency map that annotation program 101 generated from a previous image. In an embodiment, a historical saliency map is a saliency map retrieved from an external source, such as a database, website, or image repository. In an embodiment, a historical saliency map further includes bounding boxes located around objects in the saliency map. In an embodiment, a historical saliency map is a fused saliency map previously generated by annotation program 101. In an embodiment, annotation program selects one or more historical saliency maps based on a historical saliency map having a similarity score with the saliency map generated from the input above a predetermined threshold. In an embodiment, an average historical saliency map is generated from a combination of saliency maps having a similarity score above a predetermined threshold, in which the average of the images brightness of the pixels, location, size, and position of the bounding boxes is calculated and displayed on a single historical saliency map. In an embodiment, the historical saliency map is generated from a combination of images that include one or more predetermined characteristics, such as certain poses, behavior, orientation, position, location, size, and saliency of an object that is shared between a plurality of sample images and the input image that requires annotation. In an embodiment, one or more bounding boxes of the historical saliency map are tagged as being a particular object or class of objects.

In an embodiment, annotation program 101 generates a weighted fused saliency map. In an embodiment, annotation program 101 generates a weighted fused saliency map from a combination of one or more of the image saliency map of the image requiring annotation, one or more behavior saliency maps, and one or more historical saliency maps. In an embodiment, annotation program 101 generates a bounding box around one or more objects in an image based on the fused saliency map. In an embodiment, annotation program 101 tags an object contained within a bounding box as being a particular object or class of objects based on the tag included in the historical saliency map.

In an embodiment, annotation program 101 annotates an object of an image with a bounding box. In an embodiment, annotation program 101 gives weights based on relevancy. In an embodiment, if there is a large search data, the similar saliency map will have a higher weight. In an embodiment, if there are many similar images, the similar saliency map will have a higher weight. For example, when a user uploads images together, there is a greater possibility that images taken in a close proximity of time include similar objects. In this example, images taken with a predetermined threshold of time are likely to be given greater weight.

Figure 2:
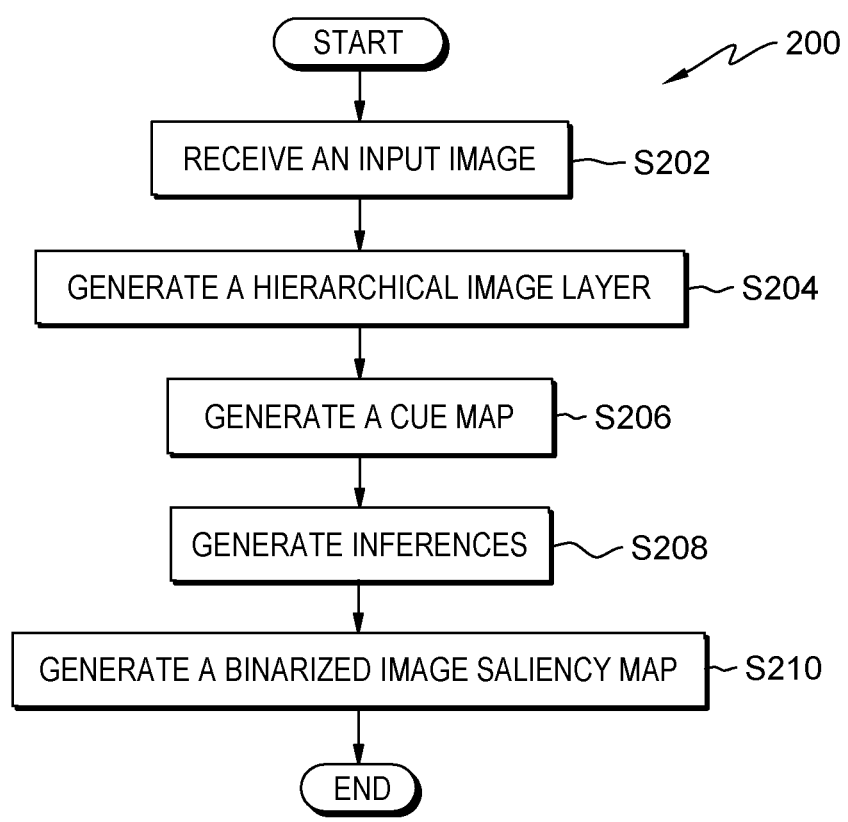
FIG. 2 is a flow chart diagram depicting operational steps for generating an image saliency map in accordance with at least one embodiment of the present invention.

FIG. 2 is a flow chart diagram, generally designated 200, depicting operational steps for generating a saliency map corresponding to an image that requires annotation in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, annotation program 101 receives an image input. In an embodiment, the image input is one or more images. In an embodiment, the image input is a video. In these embodiments, annotation program 101 divides the video into individual images or frames.

At step S204, annotation program 101 generates a hierarchical image layer. For example, annotation program 101 segments the image into a plurality of image layers. In an embodiment, annotation program 101 generates an oversegmented image.

At step S206, annotation program 101 generates a cue map. In an embodiment, annotation program 101 generates a cue map by identifying local contrasts in the different image layers. In an embodiment, annotation program 101 determines the contrast saliency cue for a pixel in the input image. In an embodiment, the contrast saliency cue is dependent on the number of pixels and the colors of the pixels.

At step S208, annotation program 101 generates inference from the different image layers, saliency cues, and saliency cue maps corresponding to the different image layers. In an embodiment, annotation program 101 determines hierarchical inferences corresponding to the different image layers based on a tree-structure graphical model. In an embodiment, annotation program 101 determines nodes which represent regions corresponding to particular image layers. In an embodiment, the hierarchical model is generated by applying a weighted average to all single-layer saliency cue maps.

At step S210, annotation program 101 generates a binarized image saliency map. In an embodiment, annotation program 101 generates an image saliency map based on the plurality of image layers, the plurality of saliency cues within the plurality of image layers, and the hierarchical inferences drawn thereof from the tree-structure graphical model.

Figure 3:
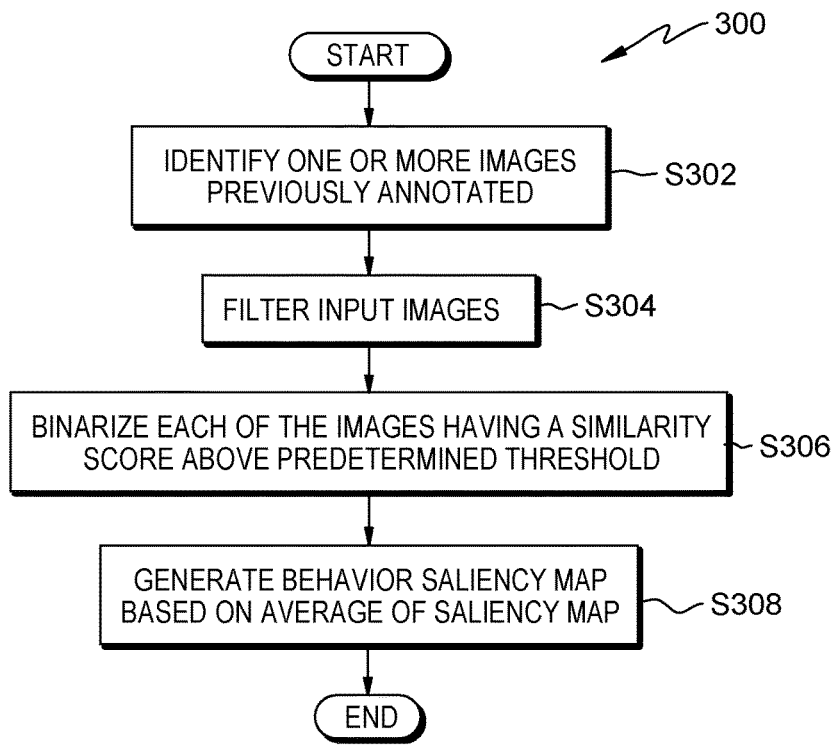
FIG. 3 is a flow chart diagram depicting operational steps for generating a behavior saliency map in accordance with at least one embodiment of the present invention.

FIG. 3 is a flow chart diagram, generally designated 300, depicting operational steps for generating a behavior saliency map in accordance with at least one embodiment of the present invention. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S302, annotation program 101 identifies one or more images previously annotated (i.e., images that already contain bounding boxes around objects in an image) that are similar to the input image requiring annotation.

At step S304, annotation program 101 filters the input images. In an embodiment, annotation program 101 filters the similar images such that only those images having a similarity score above a predetermined threshold are selected.

At step S306, annotation program 101 binarizes each of the images having a similarity score above the predetermined threshold. In other words, annotation program 101 generates a saliency map for each of the images having a similarity score above the predetermined threshold.

At step S308, annotation program 101 generates a behavior saliency map based on an average of the saliency maps created in step S306.

Figure 4:
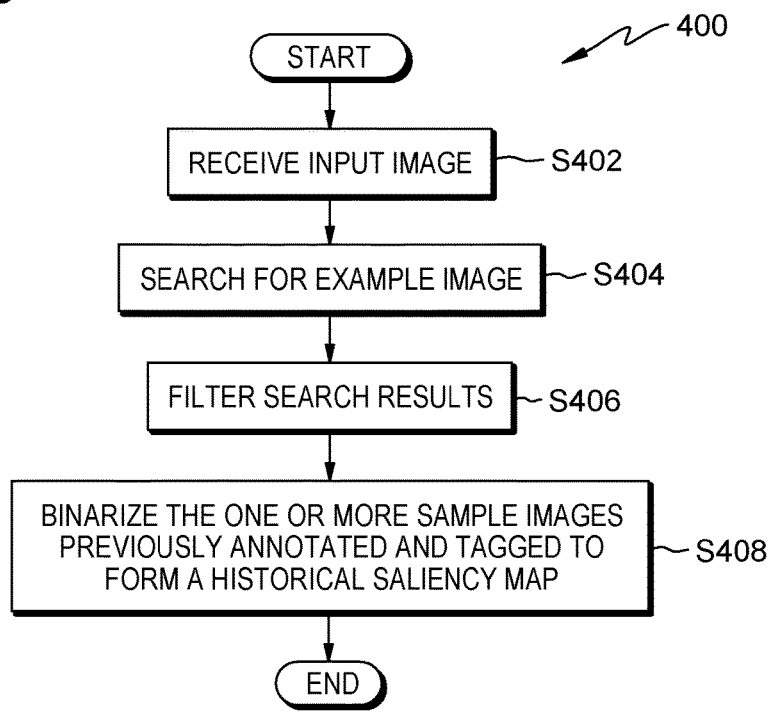
FIG. 4 is a flow chart diagram depicting operational steps for generating a historical saliency map in accordance with at least one embodiment of the present invention.

FIG. 4 is a flow chart diagram, generally designated 400, depicting operational steps for identifying historical saliency maps in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

At step S402, annotation program 101 receives an image input. In an embodiment, the image input is one or more images. In an embodiment, the image input is a video. In these embodiments, annotation program 101 divides the video into images by freeze-frame. In an embodiment, the image input is an image saliency map.

At step S404, annotation program 101 searches for an example image. In an embodiment, annotation program 101 searches for an example image previously annotated and tagged by annotation program 101. In an embodiment, annotation program 101 searches for an example previously annotated and tagged in an external database, website, or image repository.

At step S406, annotation program 101 filters the search results. In an embodiment, annotation program 101 determines a confidence level for each search result. In an embodiment, the confidence level is determined by the relevancy of the search result to the input image. In an embodiment, annotation program 101 selects images having a similar score with the input image above a predetermined threshold level. In an embodiment, annotation program 101 limits the number of images selected to a predetermined number. For example, the top 10 most similar images are selected.

At step S408, annotation program 101 binarizes the one or more sample images previously annotated and tagged to form a historical saliency map. In an embodiment, the historical saliency map is formed from a single sample image previously annotated and tagged. In an embodiment, the historical saliency map is formed form an average of a plurality of sample images previously annotated and tagged that have a similarly score above a predetermined threshold.

Figure 5:
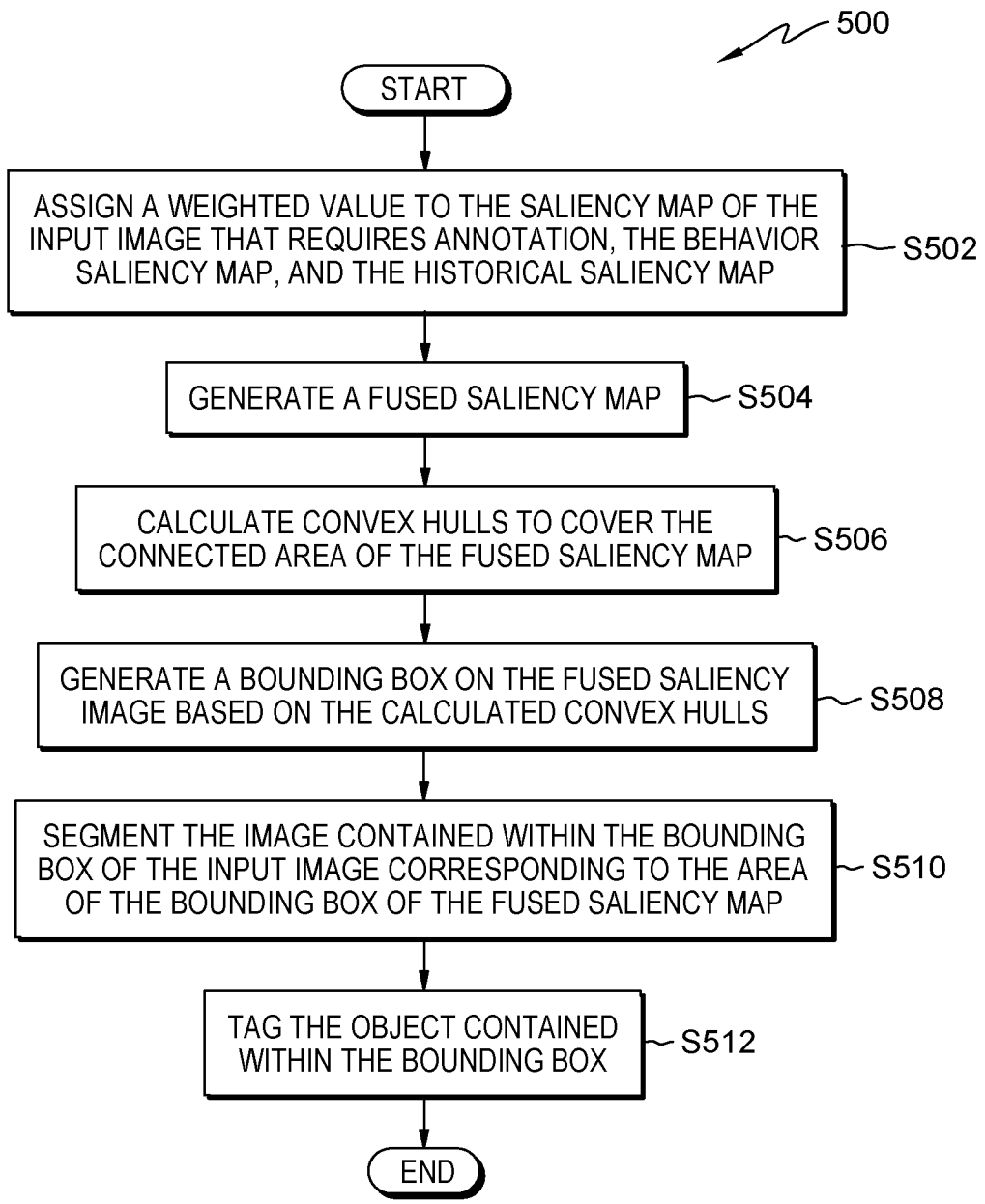
FIG. 5 is a flow chart diagram, generally designated 500, depicting operational steps for annotating and tagging objects in an input image based on analyzing an image saliency map of the input image, a behavior saliency map, and a historical saliency map in accordance with at least one embodiment of the present invention.

FIG. 5 is a flow chart diagram, generally designated 500, depicting operational steps for annotating and tagging objects in an input image based on a fused saliency map in accordance with at least one embodiment of the present invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

At step S502, annotation program 101 assigns a weighted value to the saliency map of the input image that requires annotation, the behavior saliency map, and the historical saliency map. In an embodiment, the weighted values are user defined and dictate the particular influence or strength of influence a particular type of saliency map has in rendering a fused saliency map. For example, a saliency map of an input image that requires annotation may be given a weight of 0.7, the behavior saliency may be given a weight of 0.3, and the historical saliency map may be given a weight of 0.5. In an embodiment, the weighted values are automatically determined based on an image attention mechanism. An image attention mechanism is a form of neural network that selectively concentrates on a few relevant features of an image, while ignoring other non-relevant features. Based on a similarly between predetermined relevant features between the saliency map of the input image that requires annotation and the behavior saliency map and historical saliency map, annotation program 101 generates weighted values for the respective saliency maps. In an embodiments, annotation program 101 determines a weighted value for each respective type of saliency map based on a degree of similarity between the saliency map of the input image and the behavior and historical saliency maps.

At step S504, annotation program generates a fused saliency map. In an embodiment, the fused saliency map is generated based, at least in part, on the saliency map generated from the input image, the behavior saliency map, the historical saliency map, their respective weighted values. In an embodiment, the fused saliency map is generated via image fusion.

At step S506, annotation program 101 calculates convex hulls to cover the connected area of the fused saliency map. A convex hull (i.e., convex envelope or convex closure) of a shape is the smallest convex set that contains it. In an embodiment, annotation calculates convex hulls for the salient region of the fused saliency map. The salient region is the region that likely presents the main meaningful or semantic contents.

At step S508, annotation program 101 generates a bounding box on the fused saliency image based on the calculated convex hulls.

At step S510, annotation program 101 segments the image contained within the bounding box of the input image corresponding to the area of the bounding box of the fused saliency map. In an embodiment, annotation program 101 performs semantic segmentation of the image contained within the bounding box. Semantic segmentation is a pixel wise annotation, where every pixel contained within the bounding box is assigned to a class. There classes could be, for example, pedestrian, car, bus, road, sidewalk, etc., and each pixel carries a semantic meaning.

At step S512, annotation program 101 tags the object contained within the bounding box. In an embodiment, annotation program 101 tags the object based on comparing a semantic class of the pixels contained within the bounding box to sample images having pixels with the same semantic class. In an embodiment, annotation program 101 tags the object with the same tag as the tag included in the historical saliency map.

Figure 6:
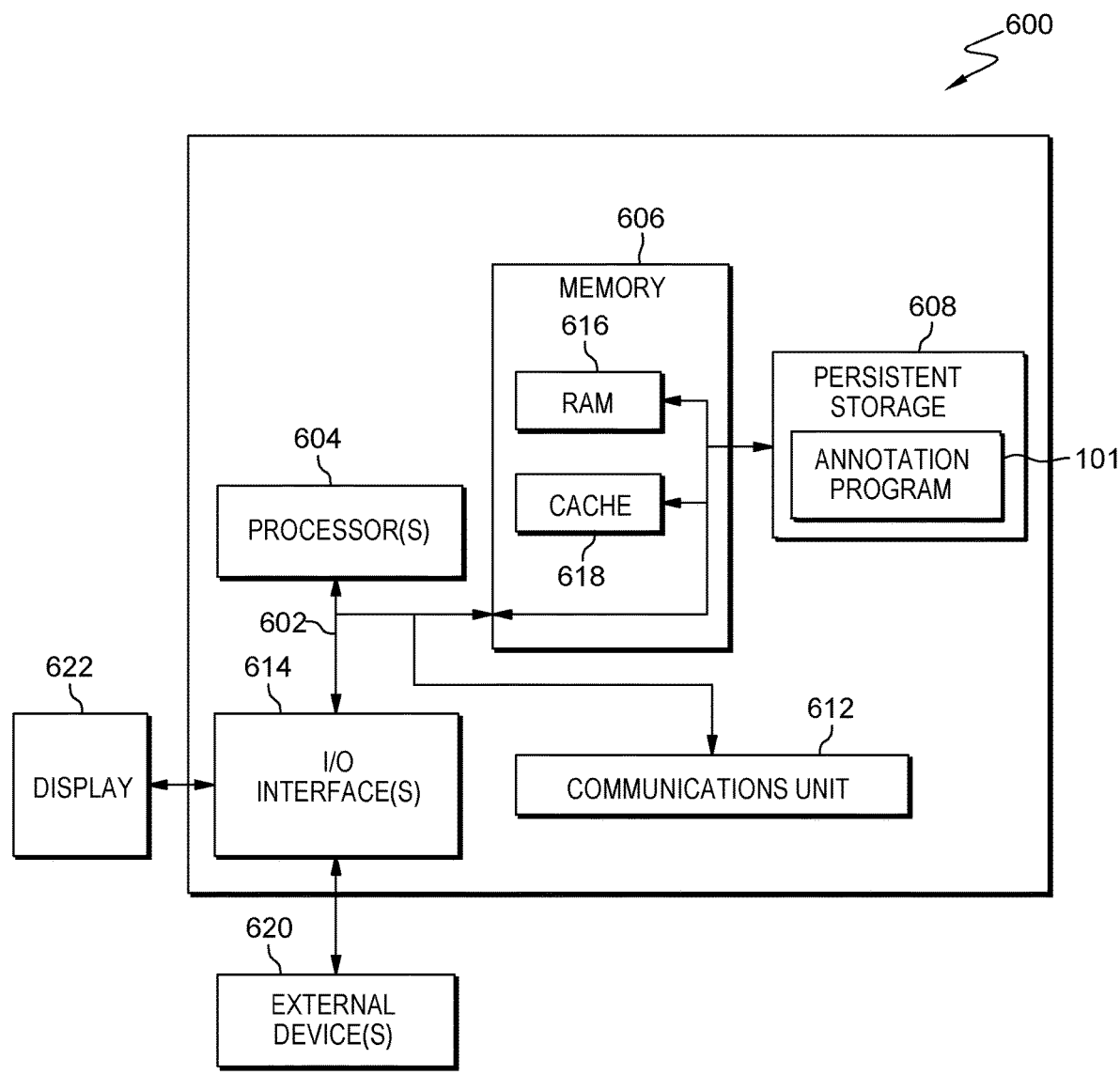
FIG. 6 is a block diagram depicting components of a computer, generally designated 600, suitable for executing an annotation program 101 in accordance with at least one embodiment of the present invention.

FIG. 6 is a block diagram depicting components of a computing device, generally designated 600, suitable for annotation information program 101 in accordance with at least one embodiment of the invention. Computing device 601 includes one or more processor(s) 604 (including one or more computer processors), communications fabric 602, memory 606 including, RAM 616 and cache 618, persistent storage 608, which further includes annotation program 101, communications unit 612, I/O interface(s) 614, display 622, and external device(s) 620. It should be appreciated that FIG. 6 provides only an illustration of one embodiment and does not imply any limitations with regard to the environments in which different embodiments may be implemented. Many modifications to the depicted environment may be made.

As depicted, computing device 601 operates over communications fabric 602, which provides communications between computer processor(s) 604, memory 606, persistent storage 608, communications unit 612, and input/output (I/O) interface(s) 614. Communications fabric 602 can be implemented with any architecture suitable for passing data or control information between processor(s) 604 (e.g., microprocessors, communications processors, and network processors), memory 606, external device(s) 620, and any other hardware components within a system. For example, communications fabric 602 can be implemented with one or more buses.

Memory 606 and persistent storage 608 are computer readable storage media. In the depicted embodiment, memory 606 includes random-access memory (RAM) 616 and cache 618. In general, memory 606 can include any suitable volatile or non-volatile one or more computer readable storage media.

Program instructions for annotation program 101 can be stored in persistent storage 608, or more generally, any computer readable storage media, for execution by one or more of the respective computer processor(s) 604 via one or more memories of memory 606. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 612, in these examples, provides for communications with other data processing systems or devices. In these examples, communications unit 612 can include one or more network interface cards. Communications unit 612 may provide communications through the use of either or both physical and wireless communications links. In the context of some embodiments of the present invention, the source of the various input data may be physically remote to computing device 601 such that the input data may be received, and the output similarly transmitted via communications unit 612.

I/O interface(s) 614 allows for input and output of data with other devices that may operate in conjunction with computing device 601. For example, I/O interface(s) 614 may provide a connection to external device(s) 620, which may be as a keyboard, keypad, a touch screen, or other suitable input devices. External device(s) 620 can also include portable computer readable storage media, for example thumb drives, portable optical or magnetic disks, and memory cards. Software and data used to practice embodiments of the present invention can be stored on such portable computer readable storage media and may be loaded onto persistent storage 608 via I/O interface(s) 614. I/O interface(s) 614 also can similarly connect to display 622. Display 622 provides a mechanism to display data to a user and may be, for example, a computer monitor.

What is claimed is:

1. A computer-implemented method for annotating images, comprising:
    generating a saliency map corresponding to an input image, wherein the input image is an image that requires annotation;
    generating a behavior saliency map, wherein the behavior saliency map is a saliency map formed from an average of a plurality of objects contained within respective bounding boxes of a plurality of sample images;
    generating a historical saliency map, wherein the historical saliency map is a saliency map formed from an average of a plurality of tagged objects in the plurality of sample images;
    fusing the saliency map corresponding to the input image, the behavior saliency map, and the historical saliency map to form a fused saliency map; and
    generating, based on the fused saliency map, a bounding box around an object in the input image.

2. The computer-implemented method of claim 1, wherein fusing the saliency map corresponding to the input image, the behavior saliency map, and the historical saliency map to form the fused saliency map is further based on, at least in part, on:
assigning one or more weighted values to the saliency map corresponding to the input image, the behavior saliency map, and historical saliency map, respectively.

3. The computer-implemented method of claim 2, wherein the one or more weighted values assigned to the saliency map corresponding to the input image, the behavior saliency map, and the historical saliency map are automatically determined based on an image attention mechanism.

4. The computer-implemented method of claim 1, wherein generating the saliency map corresponding to the input image further includes:
generating a hierarchical image layer; and
generating one or more saliency cues for the hierarchical image layer.

5. The computer-implemented method of claim 1, wherein generating the historical saliency map further includes:
selecting one or more sample images above a predetermined threshold, wherein the predetermined threshold is based on a degree of similarity between the sample image and the input image.

6. The computer-implemented method of claim 1, further comprising:
tagging the bounding box as a particular type of object.

7. The computer-implemented method of claim 6, wherein tagging the bounding box includes comparing a first salient region contained within the bounding box of the fused saliency map to a second salient region of an image previously tagged.

8. A computer program for annotating images, the computer program product comprising one or more computer readable storage media and program instructions stored on the one or more computer readable storage media, the program instructions including instructions to:
generate a saliency map corresponding to an input image, wherein the input image is an image that requires annotation;
generate a behavior saliency map, wherein the behavior saliency map is a saliency map formed from an average of a plurality of objects contained within respective bounding boxes of a plurality of sample images;
generate a historical saliency map, wherein the historical saliency map is a saliency map formed from an average of a plurality of tagged objects in the plurality of sample images;
fuse the saliency map corresponding to the input image, the behavior saliency map, and the historical saliency map to form a fused saliency map; and
generate, based on the fused saliency map, a bounding box around an object in the input image.

9. The computer program product of claim 8, wherein the instructions to fuse the saliency map corresponding to the input image, the behavior saliency map, and the historical saliency map to form the fused saliency map is further based on, at least in part, on instructions to:
assign one or more weighted values to the saliency map corresponding to the input image, the behavior saliency map, and historical saliency map, respectively.

10. The computer program product of claim 9, wherein the instructions for the one or more weighted values assigned to the saliency map corresponding to the input image, the behavior saliency map, and the historical saliency map are automatically determined based on an image attention mechanism.

11. The computer program product of claim 8, wherein the instructions to generate the saliency map corresponding to the input image further includes instructions to:
generate a hierarchical image layer; and
generate one or more saliency cues for the hierarchical image layer.

12. The computer program product of claim 8, wherein the instructions to generate the historical saliency map further includes instructions to:
select one or more sample images above a predetermined threshold, wherein the predetermined threshold is based on a degree of similarity between the sample image and the input image.

13. The computer program product of claim 8, further comprising instructions to:
tag the bounding box as a particular type of object.

14. The computer program product of claim 13, wherein instructions to tag the bounding box further includes instructions to compare a first salient region contained within the bounding box of the fused saliency map to a second salient region of an image previously tagged.

15. A computer system for updating a device, comprising:
one or more computer processors;
one or more computer readable storage media; and
computer program instructions, the computer program instructions being stored on the one or more computer readable storage media for execution by the one or more computer processors, the computer program instructions including instructions to:
generate a saliency map corresponding to an input image, wherein the input image is an image that requires annotation;
generate a behavior saliency map, wherein the behavior saliency map is a saliency map formed from an average of a plurality of objects contained within respective bounding boxes of a plurality of sample images;
generate a historical saliency map, wherein the historical saliency map is a saliency map formed from an average of a plurality of tagged objects in the plurality of sample images;
fuse the saliency map corresponding to the input image, the behavior saliency map, and the historical saliency map to form a fused saliency map; and
generate, based on the fused saliency map, a bounding box around an object in the input image.

16. The computer system of claim 15, wherein the instructions to fuse the saliency map corresponding to the input image, the behavior saliency map, and the historical saliency map to form the fused saliency map is further based on, at least in part, on instructions to:
assign one or more weighted values to the saliency map corresponding to the input image, the behavior saliency map, and historical saliency map, respectively.

17. The computer system of claim 16, wherein the instructions for the one or more weighted values assigned to the saliency map corresponding to the input image, the behavior saliency map, and the historical saliency map are automatically determined based on an image attention mechanism.

18. The computer system of claim 15, wherein the instructions to generate the saliency map corresponding to the input image further includes instructions to:
generate a hierarchical image layer; and generate one or more saliency cues for the hierarchical image layer.

19. The computer system of claim 15, wherein the instructions to generate the historical saliency map further includes instructions to:
select one or more sample images above a predetermined threshold, wherein the predetermined threshold is based on a degree of similarity between the sample image and the input image.

20. The computer system of claim 15, further comprising instructions to:
tag the bounding box as a particular type of object.

* * * * *